US00RE48975E

(19) United States
(12) Reissued Patent
Stodola et al.

(10) Patent Number: US RE48,975 E
(45) Date of Reissued Patent: Mar. 15, 2022

(54) METHOD AND APPARATUS FOR SECURING NON-LOAD BEARING WALLS

(71) Applicant: SIMPSON STRONG-TIE COMPANY INC., Pleasanton, CA (US)

(72) Inventors: Matthew Stodola, Bellingham, WA (US); Paul Akers, Bellingham, WA (US)

(73) Assignee: SIMPSON STRONG-TIE COMPANY INC., Pleasanton, CA (US)

(21) Appl. No.: 16/833,962

(22) Filed: Mar. 30, 2020

Related U.S. Patent Documents

Reissue of:
(64) Patent No.: 8,458,972
Issued: Jun. 11, 2013
Appl. No.: 13/065,906
Filed: Mar. 31, 2011

(51) Int. Cl.
*E04B 2/74* (2006.01)
*E04B 2/82* (2006.01)

(52) U.S. Cl.
CPC ..... *E04B 2/7457* (2013.01); *E04B 2/825* (2013.01)

(58) Field of Classification Search
CPC ..... F16B 19/02; F16B 5/0233; F16B 5/0241; B25B 23/10; B25B 23/101; B25B 23/105; B25B 23/108
USPC ..... 52/92.1, 92.2, 92.3, 236.7, 236.9, 262, 52/703, 745.06; 81/451, 436; 411/546
See application file for complete search history.

(56) References Cited

U.S. PATENT DOCUMENTS

| | | | | |
|---|---|---|---|---|
| 1,683,796 | A * | 9/1928 | Pearce | 81/53.2 |
| 2,940,488 | A * | 6/1960 | Riley, Jr. | 81/429 |
| 3,260,544 | A * | 7/1966 | Hathaway, Jr. | 74/548 |
| 3,881,293 | A * | 5/1975 | Conville | 52/712 |
| D379,578 | S * | 6/1997 | Daniels | D8/70 |
| 5,906,080 | A * | 5/1999 | diGirolamo et al. | 52/243.1 |
| 6,868,757 | B2 * | 3/2005 | Hufnagl et al. | 81/55 |
| 7,104,024 | B1 * | 9/2006 | diGirolamo | E04B 2/767 403/231 |
| 7,387,054 | B2 * | 6/2008 | Rajotte | 81/429 |
| 8,458,972 | B1 | 6/2013 | Stodola et al. | |
| 2003/0068205 | A1 * | 4/2003 | Augustine | E04B 2/825 405/303 |
| 2007/0034060 | A1 * | 2/2007 | McCracken | B25B 23/0064 81/429 |
| 2007/0122253 | A1 * | 5/2007 | Murtha | 411/546 |

* cited by examiner

*Primary Examiner* — Terrence R Till
(74) *Attorney, Agent, or Firm* — Buchalter; Cecily Anne O'Regan

(57) ABSTRACT

A method and apparatus for securing non-load bearing interior walls in a wood frame structure in a manner that allows for vertical deflection of the frame includes a plurality of sleeved fastener assemblies, each having a threaded fastener extending through a shorter outer sleeve with an enlarged diameter head. The fasteners hold interior non-load bearing walls in place through a predrilled hole in the top plates of the walls, while being capable of accommodating limited vertical movement caused by vertical deflection of the building frame during construction and beyond.

17 Claims, 4 Drawing Sheets

METHOD AND APPARATUS FOR SECURING NON-LOAD BEARING WALLS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[Not applicable.] *This application is a reissue of U.S. application Ser. No. 13/065,906, filed Mar. 31, 2011, now U.S. Pat. No. 8,458,972, which is incorporated herein by reference in its entirety.*

FEDERALLY SPONSORED RESEARCH

Not applicable.

SEQUENCE LISTING, ETC ON CD

Not applicable.

BACKGROUND OF THE INVENTION

1. Field of the Invention

This invention relates to wood framed buildings and, more particularly, to devices that enable a wood frame building to flex and deflect under normal loads without adversely affecting the interior walls and floors.

2. Description of Related Art

The present invention is a method and apparatus for securing non-load bearing interior walls in a wood frame structure in a manner that allows for vertical deflection of the frame during construction as well as during long term use of the finished building.

In recent years the construction of wood framed buildings has become generally standardized with the introduction of pre-fabricated roof trusses and more recently the I-joist roof and floor systems. Carpenters assemble the pre-manufactured structural components to the structure using nailed metal hardware which is allegedly designed to address the deflection needed for optimal performance of each assembly. Wall hanging hardware that accommodates deflection has been designed and installed in many different ways which look good on paper but often do not work out very well once they are actually built and installed in the field. Issues ranging from simply nailing the hardware too tight; or, overbuilding of blocking systems for fastening; or, I-Joist and blocking splitting apart when nailed horizontally into the laminations. Aside from these structural problems, it is also common to find that a "silent floor" is not silent at all due to standard slotted clips and blocking creaking and squeaking as one walks on the floor and the floor flexes.

Clearly there is a need in the prior art for a wall mounting system that accommodate flexure of the building frame as it is constructed and subsequently as it is used after the building construction is completed.

BRIEF SUMMARY OF THE INVENTION

The present invention generally comprises a method and apparatus for securing non-load bearing interior walls in a wood frame structure in a manner that allows for vertical deflection of the frame. The apparatus of the invention includes a plurality of sleeved fastener assemblies, each including an outer sleeve having a bore dimensioned to receive a threaded fastener in freely rotating fashion with no extra free play. One end of the sleeve is provided with an enlarged diameter head. The sleeve may be made with pre-consumer recycled material for near-zero waste production.

The fasteners hold interior non-load bearing walls in place through a pre-drilled hole in the top plates, while being capable of accommodating limited vertical movement caused by vertical deflection of the building frame during construction and beyond. By using a ¾" top plate to create a gap with the superjacent framing, the non-load bearing walls never become inadvertently loaded due to uneven concrete and framing conditions. This system helps eliminate: squeaking floors, failures in I-joists from unblocked non-bearing wall lines, stress cracks in drywall, door compression/adjustment issues, uneven floors, and noise transfer.

In one example of the use of the invention, when prefabricated roof trusses are rolled and have all the lateral bracing installed on the top of the bottom cord of the truss, a hole is drill up through the double top plate of the wall directly under the trusses to be fastened. The sleeve is fully inserted through the bottom opening of the hole with the head impinging at the bottom end, and the threaded fastener is extended up through the sleeve to impinge on the truss. The self-tapping fastener is then driven into the superjacent truss until a gap of pre-determined dimension is established between the top plate and the truss. The invention also provides an adjustable fastener driver designed to drive the threaded fastener in the sleeve and establish the desired gap spacing between truss and top plate. If there is a stud directly under the truss or for some reason it is not possible to drive the fastener assembly from underneath, a flat block may be added between two adjacent trusses and the fastener may be secured to the added blocking. For walls being installed parallel to the trusses it is necessary first to install flat blocks up 1½" and then install the sheet rock backing flush with the bottom of trusses and install the fastener assemblies from top or bottom with the fastener driver.

For wood I-Joist floor and roof systems, for walls parallel to the joists, after the I-Joists have been installed it is necessary to flat block over the parallel wall I-Joist between the tops of the adjacent bottom cords of the joists. Thereafter the sheet rock backing is fastened to the flat blocks, and then the sleeve holes are drilled up or down through the top plates. The threaded fasteners are installed and driven generally flush, with reduced tension so the walls are not lifted by over-tightening. Flat blocking isn't necessary on walls perpendicular to the joists, since the fastener assemblies may be installed wherever the wall section intersects the bottom cord of a joist. However, if the floor joists directly stack over (line up with) the wall studs, flat blocks can be installed between the I-joists in alignment with the wall section to provide mounting surfaces for the fasteners and the walls. The floor should be sheeted and nailed down first. It is suggested to use a ¾" top plate on all interior non-bearing walls to give proper clearance and maintain consistent stud heights.

Another distinct advantage of the present invention is that installing the fastener assemblies of the invention from the underside of the wall top plate makes moving walls or joists very easy. It is necessary only to unscrew the fastener assemblies and the wall is free to be removed. No nail pullers or Sawzalls are needed, and the takedown is accomplished neatly and cleanly. A further advantage is that the fastener assemblies 21 support the wall sections while minimizing the contact area between the wall framing and the building frame. As a result the transmission of sound and vibration between the walls and building framing is minimized, creating greater acoustic comfort.

DESCRIPTION OF THE PREFERRED EMBODIMENT

Figures 1, 2, 3:
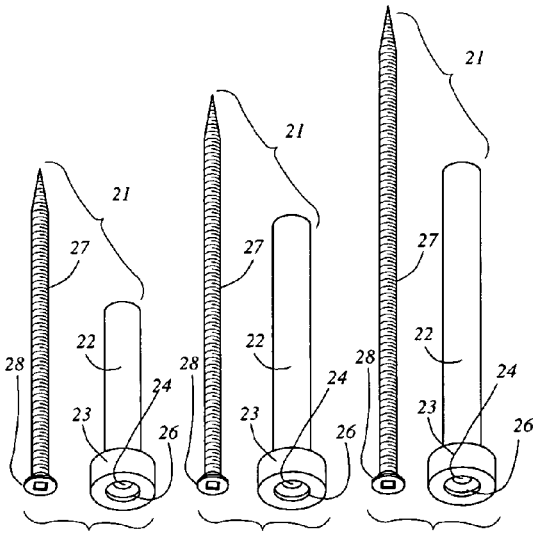
FIGS. 1-3 are each exploded views of different sizes of the fastener apparatus of the present invention.

The present invention generally comprises a method and apparatus for securing non-load bearing interior walls in a wood frame structure in a manner that allows for vertical deflection of the frame. With regard to FIGS. 1-3, the apparatus includes a fastener assembly 21 comprised of a deflector sleeve 22 having a tubular construction. The (nominally) lower end of the sleeve 22 is attached to a head 23 having a diameter larger than the sleeve. A bore 24 extends through the sleeve 22 and head 23, with a counterbore 26 formed in the head 23. The deflector sleeve and head may be formed integrally of metal or plastic materials. In the preferred embodiment it is formed of pre-consumer plastic waste material or the like.

The fastener assembly 21 further includes a threaded fastener 27, which is preferably a self-tapping wood screw having a [socket] *fastener* head 28 of any appropriate format (size and shape) known in the prior art. The [socket] *fastener* head 28 is sized to be a complementary fit within the counterbore 26 of the sleeve head 23. The screw 27 is dimensioned to be slidably received within the bore 24 of the sleeve 22 with no free play, and the length exceeds the length of the sleeve 22 by a predetermined amount, for purposes explained below. Note that each sleeve 22 of FIGS. 1-3 is successively greater in length, and each of the respective screws 27 exceeds that length by about the same length. The lengths may range from 3/16"-3/4" in diameter and the screw is approximately 2"-4" longer than its mating sleeve component.

Figure 4:
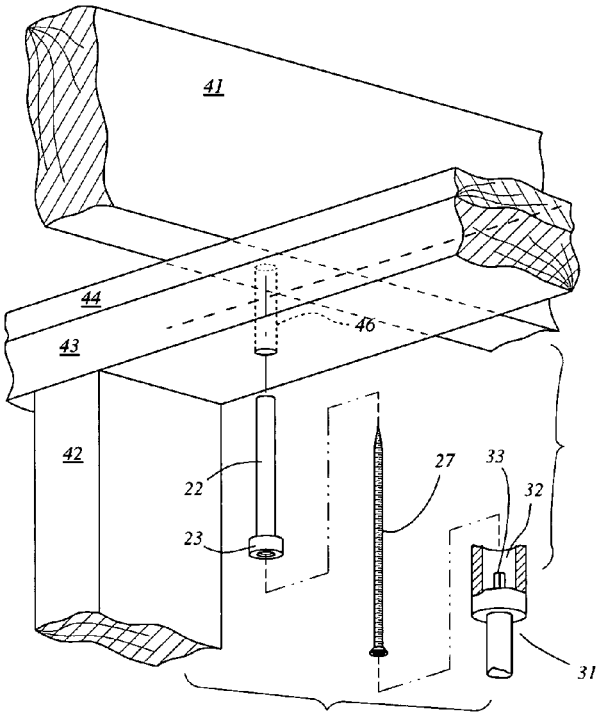
FIG. 4 is an exploded view showing the method used to install the fastener assembly of the present invention.

With regard to FIG. 4, a useful accessory for the apparatus of the invention is a driver bit 31 used to install the sleeve 22 and screw 27. The shank end is a standard component adapted to be releasably held in the chuck of an electric drill or similar rotary tool. The distal end of the driver bit is provided with a cylindrical receptacle 32 having a driver 33 (hex, Torx, square, etc.) extending coaxially from the inner end thereof. The receptacle 32 is dimensioned and shaped to receive the head 23 of the sleeve 22, with the driver 33 engaging the drive socket of the fastener head 28. The depth of the receptacle 32 is predetermined to release the head 23 at a desired distance from the surface receiving the installation, as will be described below.

With continued reference to FIG. 4, in a generalized description of the use of the invention an interior, non-load bearing wall construction is to be installed in a wood frame building. A typical wall section may comprise a series of wall studs 42 extending vertically between a footer (not shown) and a header 43, often made of 2×4 lumber or strand board, the wall studs 42 being spaced apart on common centers such as 16". The wall section is supported below by the footer resting on the floor framing, and above by attachment to the superjacent framing such as the joists 41 of the floor framed above.

To employ the fastener assemblies 21 of the invention, a top plate 44 such as a 3/4" board is secured atop the header 43, and a hole 46 is drilled upwardly through the header and top plate at a location where it will align with the beam 41, or other structural components as described below. The screw 27 is assembled in the bore of deflector sleeve 22, and the head end of assembly 21 is loaded into the receptacle of driver bit 31. The fastener assembly 21 is then inserted into hole 46, so that the tip of screw 27 impinges on joist 41. The rotary driver then drives the screw into the beam 41, pulling the sleeve 22 into the hole 46. As the distal end of the driver bit 31 impinges on the bottom surface of the header 43, further advancement of the screw into beam 41 tends to free the screw head socket from the driver 33, at which point the fastener assembly is no longer engaged by the driver. The depth of the receptacle 32 determines the spacing of the head 23 from the bottom surface of header 43. Thus the head 23 may impinge fully on the surface of header 43 or be spaced apart therefrom a distance that is pre-determined to allow flexure of the building framing without damaging the interior non-bearing walls by that very flexure.

Figure 5:
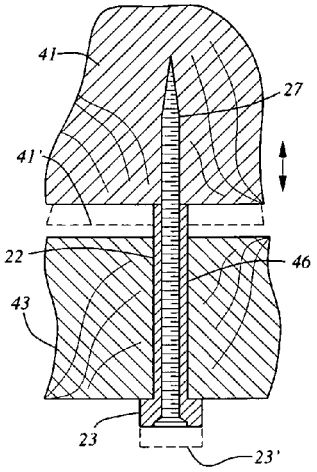
FIGS. 5-7 are each cross-sectional elevations showing the fastener apparatus installed in three different typical applications.

The fastener assemblies may be used in several different ways to secure non-bearing walls and the like to building framing. As shown in FIG. 5, a fastener assembly such as the shorter embodiment of FIG. 1 may be chosen, the length of sleeve 22 being greater than the height of header 43 by a predetermined length, such as about 3/4". Hole 46 is drilled vertically upwardly through header 43, and fastener assembly 21 is installed in the hole with the head 23 impinging flush with the bottom surface of header 43. The excess length of the sleeve extends through hole 46 and protrudes upwardly from header 43. The upper end of sleeve 22 abuts the bottom surface of joist 41, so that the excess length of sleeve 22 establishes a gap between the header and the superjacent beam 41. It is this gap that enables the frame to undergo loading and accommodate vertical deflection without transferring load to the non-bearing walls, thereby alleviating prior art problems such as stress cracks at the corners of door openings, buckled wall sheathing, doors that stick or will not latch, and the like.

For example, as shown in FIG. 5, the upper beam 41 may be loaded and driven to deflect downwardly, as shown at position 41'. With the screw firmly anchored in beam 41, this movement will drive the sleeve to translate downwardly in hole 46, and head 23 will likewise move downwardly to position 23'. This permissible movement does not impart any new loading to the header 43, so the wall supported by fastener assembly 22 remain non-load bearing. It should be noted that a large plurality of fastener assemblies are generally employed to secure a wall section to a superjacent support structure, and they are distributed generally equally spaced along the header of the wall section. Of course, their positions can be adjusted by inspection during construction to assure that they are properly aligned with the overlying support structure.

Figure 6:
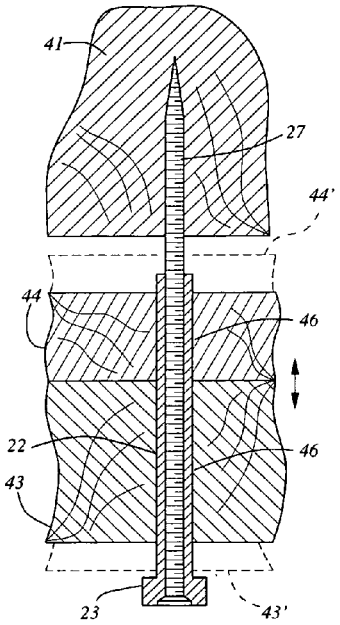

With regard to FIG. 6, in a further example of the use of the invention a wall section having a header 43 and a top plate 44 is secured to an overlying frame member 41. Note that there is a gap between the top plate and frame member 41. A fastener assembly such as the medium length embodiment of FIG. 2 may be chosen, the length of sleeve 22 being greater than the combined height of header 43 and top plate 44 by a predetermined length, such as about ¾". The length of screw 27 exceeds the sleeve length by approximately 2"-4". The fastener assembly 21 is installed in hole 46 using a driver bit 31 that sets the head 23 to be spaced apart from the bottom surface of header 43 by a predetermined distance, such as ⅜"-¾".

There are a plurality of fastener assemblies installed as shown in FIG. 6, and the use of the driver bit 31 assures that they are all installed to the same depth and spacing of the head 23. When the wall section expands or contracts, e.g., from changes in temperature and/or humidity, the top plate may move upwardly to position 44' or the header may deflect downwardly to position 43', while the screw 27 remains firmly anchored in the support beam 41. The movement of the structural members is accommodated by the fastener assemblies 21, so that frame flexure does not damage the interior non-bearing walls.

Figure 7:
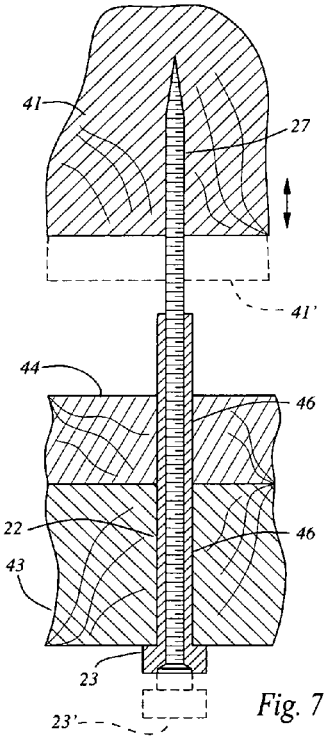

FIG. 7 depicts an installation example similar to that shown in FIG. 6, with the fastener assembly 21 being the embodiment shown in FIG. 3, and the head 23 is flush with the bottom surface of header 43. Here the gap between the overlying frame member 41 and the top plate 44 is larger, and the expected frame deflection is the downward movement of beam 41 to the position 41'. This movement is accommodated by movement of the sleeve 22, so that head 23 moves to position 23', and frame flexure does not damage the interior non-bearing walls.

It may be appreciated that in general the amount of spacing and deflection accommodation that is incorporated into the interior wall mounting by the fastener assemblies is dependent upon the configuration of the structure and the amount of loading that is expected to be placed on the framing by superjacent floors and framing, finishing work, and furnishings.

In the installation examples shown herein, if there is a wall stud directly under the joist or truss or for some reason it is not possible to drive the fastener assembly from underneath, a flat block may be added between two adjacent joists or trusses and the fastener may be secured to the added blocking.

Note that both the drilling and installation steps may be carried out using a drill bit extension for drilling and then installing the fastener assemblies 21. The extension enables a worker to carry out the invention while standing on the floor deck and drilling and installing upwardly into the superjacent floor frame, without requiring working on a ladder or scaffold.

Figure 8:
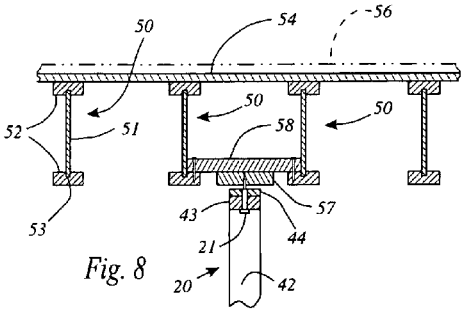
FIG. 8 is a cross-sectional elevation of a portion of a typical floor and its I-Joist supports, with the fastener assembly of the invention securing the top of a non-load bearing wall to blocking between the I-Joist structures.
Figure 9:
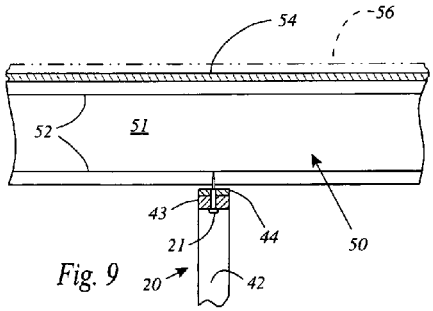
FIG. 9 is a cross section elevation of the invention as depicted in FIG. 8, with the fastener assembly of the invention securing the top of a non-load bearing wall directly to the I-Joist structures.

With regard to FIGS. 8 and 9, the fastener assemblies 21 may be used to hang interior non-bearing walls from I-Joist floor structures. As has been known in the prior art for at least 40 years, an I-Joist 50 generally includes a longitudinally extending, vertically oriented panel or web 51, and a pair of flange or chord boards 52 extending longitudinally. The flange boards are typically provided with a longitudinal groove 53 that continuously engages the edge portion of the web 51, whereby lateral stiffness is imparted to the web 51. The web 51 exhibits substantial stiffness in the vertical plane of the web, enabling it to support large vertical loads. Typically the I-joists are fully supported at both ends and blocked laterally (not shown) side-by-side to prevent deflection out of the vertical alignment of the web 51, so that the load bearing strength is maintained. A sheathing or deck surface 54 is laid atop the I-Joists 51 and extends continuously to join the top edges of the I-Joists and create a strong, unified structure. The deck 54 also forms a subfloor for the floor treatment 56, all supported by the I-Joists 50.

To hang an interior wall section 20 (typically formed of vertical studs 42, a top header 43 and a top plate 44 as before), if the wall section is aligned parallel to the I-Joists 50, it is necessary to install flat blocking 57 and 58 between two adjacent I-joists at a position between two wall studs 42 of the wall section being installed, using nails, screws, adhesive, or any combination thereof. Thereafter the fastener assemblies 21 may be installed as before by drilling hole 46 upwardly and then driving the screw 27 upwardly through the hole 46 to be anchored in the blocking 57 and 58. Typically there is one fastener assembly 21 per arch of the wall section being hung. The blocking 57 and 58 also provides further lateral stabilization for the I-Joists 50 to which it is joined. Note the gap established by the fastener assemblies 21 between the top plate 44 and the blocking 57 to accommodate vertical deflection of the I-Joists 50 and floor assembly 54, 56.

With regard to FIG. 9, when a wall section 20 is installed perpendicularly to (or, in general, non-parallel to) the I-joists 50, the fastener assemblies 21 may be driven directly into the lower flange boards 52 of all the I-Joists that are intersected by the wall section 20. Once again, note the gap established by the fastener assemblies 21 between the top plate 44 and the flange board 52 to accommodate frame deflection.

Figure 10:
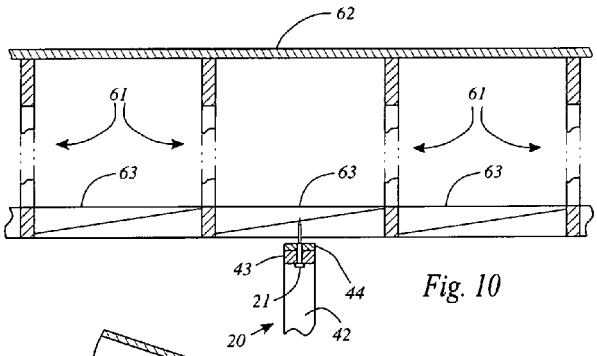
FIG. 10 is a cross-sectional elevation of a portion of a typical roof deck and its vertical floor joist supports, with the fastener assembly of the invention securing the top of a non-load bearing wall to the blocking between the roof joists.

Referring to FIG. 10, a typical roof deck may be constructed of a plurality of roof trusses 61 that are vertically oriented and disposed in a parallel, equally spaced array and supported at both ends. A roof deck or sheathing 62 is nailed or stapled to the top edges of the roof trusses 61, and shingles, tar and gravel, tiles, or other roof treatments are installed atop the sheathing 62. Lateral blocking [62] *63* is installed between all adjacent trusses 61 to assure that the trusses remain vertical under load. In a manner similar to that shown in FIG. 8, the fastener assemblies 21 may be installed as before by drilling hole 46 upwardly and then driving the screw 27 upwardly through the hole 46 to be anchored in the blocking 63. Once again, the fastener assembly is installed to establish a gap between the top plate 44 and the blocking 63 to accommodate downward deflection of the roof, such as by workers doing construction, snow or ice loads, and the like. As before, there should be one fastener assembly 21 used in each arch of the wall section 20.

Figure 11:
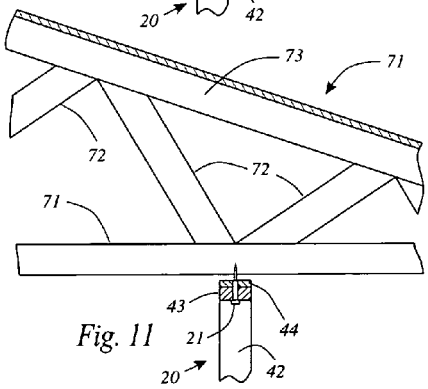
FIG. 11 is a partial plan elevation of a typical roof truss structure, with the fastener assembly of the invention securing the top of a non-load bearing wall to the roof truss.

In FIG. 11 there is shown another typical roof installation in a situation where pre-fabricated roof trusses 71 are erected in vertical orientation and spaced apart in a parallel array. Typically, a lateral joist 71 supports a plurality of links 72 that extend to an angled joist 73 that supports the roof deck. In this situation the installation is very similar to the installation shown in FIG. 9, except that the fastener assembly is anchored in the joist 71.

Figure 13:
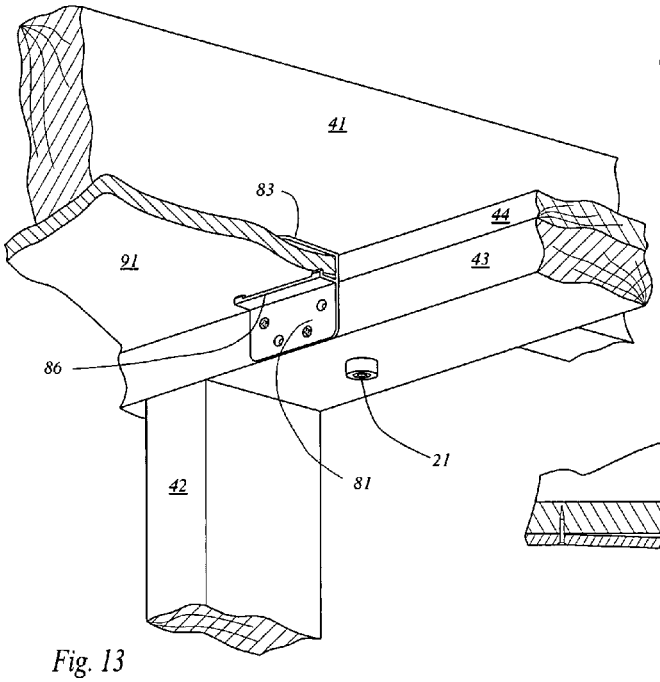
FIG. 13 is an enlarged perspective view showing a typical installation of the clip depicted in FIG. 12 installed on a wall frame that is secured with the fastener assemblies of the invention.
Figure 12:
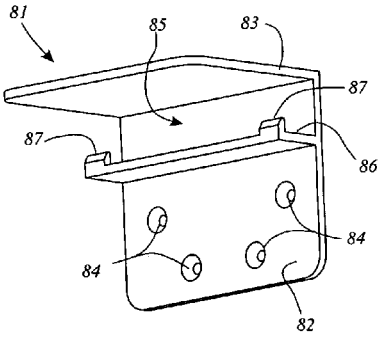
FIG. 12 is a perspective view of a clip for engaging the edge of a panel of sheetrock or the like and securing it to a wall structure erected with the fastener assemblies of the invention.
Figure 14:
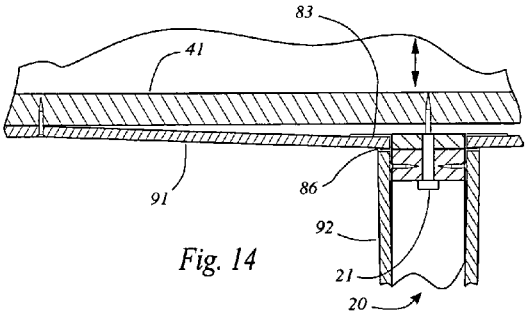
FIG. 14 is a cross-sectional elevation of a portion of a typical wall construction with a fastener assembly of the invention securing the wall to a superjacent deck structure.

With regard to FIGS. 12-14, a further accessory for the apparatus of the invention comprises a mounting clip 81 that is used to secure sheet rock and wallboard to ceilings and walls having wall sections installed with the fastener assemblies of the invention. The clip is comprised of vertical plate 82 joined at right angles to horizontal plate 83. Screw holes 84 in plate 82 enable the clip to be mounted to any vertical wood surface using nails or threaded fasteners. An interior plate 86 extends generally orthogonally from plate 82 and spaced apart from plate 83 to form a gap 85 substantially equal to the thickness of standard sheetrock or wallboard. A pair of detent teeth 87 extend from the free end of the plate 86 into the gap 85 with the plate 83. The material forming the clip 81 is sufficiently stiff to be form retaining and generally rigid, but flexible enough to allow an edge portion of sheetrock or wallboard to be inserted into the gap 85 and be retained therein by the teeth 87. It is significant to note that the plate 86 has a predetermined thickness such as ⅛"-¼" or the like.

With regard to FIGS. 13 and 14, there is shown a typical generalized use of the mounting clips 81. In a situation similar to that shown in FIG. 4, where a wall section is secured to a joist or beam 41 by a plurality of fastener assemblies 21, a subsequent construction step is the installation of sheet rock on the wall section and the adjacent ceilings. A plurality of mounting clips 81 are secured to the edges of a sheetrock panel, the edges being inserted into the gaps 85 of the clips and secured in place by teeth 87. The clips 81 are generally spaced apart equally about the perimeter of the sheetrock panel. Thereafter, the sheetrock panel 91 is lifted into place for installation, with the plates 82 of the clips impinging on the header 43 of the wall section secured by fasteners 21 to beam 41. Screws or nails are driven through holes 84 to secure the edges of the panel 91 to the header 43, so that the edges are supported on the non-load bearing framing of the wall sections. Thus the edges of the ceiling panel 91 are spaced apart from the load-bearing frame by the same amount as the wall sections secured by fasteners 21. Sheetrock screws are driven through the panel 91 to secure medial portions thereof to the overlying joists, as shown in FIG. 14, but not within a distance of 16"-24" to the walls, so that the panel 91 can flex through the established gap as the building structure deflects under loading.

Thereafter, the wall panels are installed, laid up against the wall sections installed as described herein. Note that the wall panels 92 are positioned so that the top edge abuts the plates 86 of clips 81. As a result, there is established a small spacing (on the order of ⅛") between the top edge of the wall panel 92 and the ceiling panel 91. This spacing prevents buckling or edge crushing or deformation of the wall panels 92 caused by downward deflection of the building framing as more weight is added to it during construction or during subsequent use.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for installing a wall section having vertical wall studs and a top header extending along like top ends of the wall section, in a frame structure having a plurality of floor joists or roof trusses extending above the wall section, including the steps of:

providing a plurality of fastener assemblies, each having a threaded fastener extending through a rigid sleeve member, *wherein said rigid sleeve member extends past the top of the top header by a predetermined length to form a spacing gap of predetermined dimension equal to the predetermined length between the top header and one of the plurality of floor joists or roof trusses*;

forming a plurality of holes extending vertically through the top header of the wall section, each hole being generally aligned with one of the floor joists or roof trusses; *and* extending the rigid sleeve member of one of said fastener assemblies vertically and slidably through each of said holes and through the top header of the wall section and driving the respective threaded fastener through the rigid sleeve member into the aligned floor joist or roof truss while [also] setting [a predetermined] *the* spacing gap between the floor joist or roof truss and the top header of the wall section, whereby said threaded fasteners are anchored in the floor joists or roof trusses and the wall section is supported, and said spacing gap accommodates vertical deflection of said frame structure without impinging on and loading the wall section.

2. The method for installing a wall section of claim 1, further including providing a sleeve head at one end of each of said sleeve members, said sleeve head being larger in diameter than said hole in the top header of the wall section;

further including providing a fastener rotary driver bit for engaging and rotating said threaded fastener head and said sleeve head, said fastener rotary driver bit having an axially aligned receptacle dimensioned to releasably retain said threaded fastener head and said sleeve head;

providing said receptacle of said fastener rotary driver bit with a known depth that sets a predetermined spacing between said sleeve head and a surface into which said fastener assembly is driven, said predetermined spacing forming said spacing gap.

3. The method for installing a wall section of claim 2, further including providing said sleeve head with a counterbore sized to receive the threaded fastener head therein.

4. The method for installing a wall section of claim 3, wherein said fastener assemblies are installed through said holes from below, and said threaded fasteners are threaded into said floor joists or roof trusses from below.

5. The method for installing a wall section of claim 1, wherein said threaded fastener is greater in length than said sleeve.

6. The method for installing a wall section of claim 1, wherein said threaded fastener is capable of translation within the sleeve member to accommodate vertical deflection of said frame structure without impingement on and loading of the wall section.

7. The method for installing a wall section of claim 1, wherein said sleeve member is capable of translation within the respective hole to accommodate vertical deflection of said frame structure without impinging on and loading the wall section.

8. The method for installing a wall section of claim 1, further including providing a plurality of mounting clips for a ceiling panel installed adjacent to the wall section, said mounting clips being secured to edge portions of the ceiling panel and spaced about the perimeter of the ceiling panel.

9. The method for installing a wall section of claim 8, further including the step of securing said mounting clips to the top header of the wall section, said mounting clips being free of attachment to the floor joists or roof trusses supporting the wall section.

10. Apparatus for installing a wall section having vertical wall studs and a top header extending along like top ends of the wall section, in a frame structure having a plurality of floor joists or roof trusses extending above the wall section, including:

a plurality of fastener assemblies, each having a threaded fastener extending through a rigid sleeve member, *wherein said rigid sleeve member extends past the top of the top header by a predetermined length to form a spacing gap of predetermined dimension equal to the predetermined length between the top header and one of the plurality of floor joists or roof trusses*;

a plurality of holes extending vertically in the top header of the wall section, each hole being generally aligned with one of the floor joists or roof trusses;

each of said rigid sleeve members extending vertically and slidably through one of said holes and through the top header of the wall section with the respective threaded fastener extending through the sleeve member and driven into the aligned floor joist or roof truss; *and* a fastener rotary driver bit for engaging and rotating said threaded fasteners and including means to establish [a predetermined] *the* spacing gap between the floor joist or roof truss and the top header of the wall section, whereby said threaded fasteners are anchored in the floor joists or roof trusses and the wall section is supported, and said spacing gap accommodates vertical deflection of said frame structure without impinging on and loading the wall section.

11. The apparatus for installing a wall section of claim 10, further including a sleeve head at one end of each of said sleeve members, said sleeve head being larger in diameter than said hole in the top header of the wall section.

12. The apparatus for installing a wall section of claim 11, wherein said threaded fastener includes an enlarged head end, and said sleeve head includes a counterbore for receiving said enlarged head end in complementary fashion.

13. The apparatus for installing a wall section of claim 12, said fastener rotary driver bit having an axially aligned receptacle dimensioned to releasably retain said threaded fastener head and said sleeve head.

14. The apparatus for installing a wall section of claim 13, wherein said receptacle of said fastener rotary driver bit includes a known depth that sets a predetermined spacing between said sleeve head and a surface into which said fastener assembly is driven, said predetermined spacing forming said spacing gap.

15. The apparatus for installing a wall section of claim 10, wherein said threaded fastener is greater in length than said sleeve.

16. The apparatus for installing a wall section of claim 10, wherein said threaded fastener is capable of translation within the sleeve member to accommodate vertical deflection of said frame structure without impingement on and loading of the wall section.

17. The apparatus for installing a wall section of claim 10, wherein said sleeve member is capable of translation within the respective hole to accommodate vertical deflection of said frame structure without impinging on and loading the wall section.

* * * * *